United States Patent
Ma

(10) Patent No.: US 12,028,853 B2
(45) Date of Patent: Jul. 2, 2024

(54) METHOD AND DEVICE FOR DETERMINING TIME-FREQUENCY PATTERN OF DOWNLINK POSITIONING REFERENCE SIGNAL, STORAGE MEDIUM AND BASE STATION

(71) Applicant: BEIJING UNISOC COMMUNICATIONS TECHNOLOGY CO., LTD., Beijing (CN)

(72) Inventor: Dawei Ma, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 653 days.

(21) Appl. No.: 17/266,269

(22) PCT Filed: Jul. 18, 2019

(86) PCT No.: PCT/CN2019/096465
§ 371 (c)(1),
(2) Date: Feb. 5, 2021

(87) PCT Pub. No.: WO2020/029761
PCT Pub. Date: Feb. 13, 2020

(65) Prior Publication Data
US 2021/0307045 A1 Sep. 30, 2021

(30) Foreign Application Priority Data
Aug. 9, 2018 (CN) .......................... 201810906997.5

(51) Int. Cl.
H04W 72/1273 (2023.01)
H04L 5/00 (2006.01)
(Continued)

(52) U.S. Cl.
CPC ....... *H04W 72/1273* (2013.01); *H04L 5/0048* (2013.01); *H04W 72/0446* (2013.01); *H04W 72/0453* (2013.01)

(58) Field of Classification Search
CPC ......... H04W 72/1273; H04W 72/0446; H04W 72/0453; H04L 5/0048; H04L 5/1469; H04L 27/2613; H04L 5/0007
See application file for complete search history.

(56) References Cited

U.S. PATENT DOCUMENTS

| 2012/0027110 A1* | 2/2012 | Han ...................... H04L 5/0053 375/260 |
| 2012/0044796 A1 | 2/2012 | Yoon et al. |

(Continued)

FOREIGN PATENT DOCUMENTS

| CN | 102449501 A | 5/2012 |
| CN | 104243080 A | 12/2014 |

(Continued)

OTHER PUBLICATIONS

Huawei R1-1608618 Design of new downlink positioning reference signal for NB-IOT Oct. 2016 (Year: 2016).*
(Continued)

*Primary Examiner* — Rina C Pancholi
(74) *Attorney, Agent, or Firm* — Harness, Dickey & Pierce, P.L.C.

(57) ABSTRACT

A method and device for determining a time-frequency pattern of a downlink positioning reference signal, a storage medium and a base station, the method including: determining a number of subcarriers M occupied by a time-frequency pattern of a positioning reference signal on each symbol according to a preset frequency domain multiplexed factor; generating, for multiple time slots scheduled by a user equipment, initial time-frequency patterns in a resource block where each time slot is located according to the
(Continued)

```
┌─────────────────────────────────────────────────────────┐
│ determining valid time-frequency patterns in a           │    S501
│ corresponding resource block where a first time slot of  │─┐
│ the multiple time slots is located are final time-       │
│ frequency patterns of the corresponding resource block   │
│ where the first time slot is located                     │
└─────────────────────────────────────────────────────────┘

┌─────────────────────────────────────────────────────────┐
│ at least according to a sequence of the multiple time    │    S502
│ slots, obtaining final time-frequency patterns in a      │─┐
│ corresponding resource block where a next time slot is   │
│ located by performing frequency shift to final time-     │
│ frequency patterns in a corresponding resource block     │
│ where a current time slot is located, wherein the final  │
│ time-frequency patterns in the multiple resource blocks  │
│ are the time-frequency pattern of the downlink PRS       │
└─────────────────────────────────────────────────────────┘
``` number of subcarriers M, the initial time-frequency patterns occupying all symbols in the resource block, and occupying M subcarriers on each symbol; and filtering M initial time-frequency patterns in each resource block according to the attributes of the symbol in each resource block, so as to determine valid time-frequency patterns in each resource block. Therefore, a time-frequency pattern of a downlink positioning reference signal in a NR system may be determined.

11 Claims, 5 Drawing Sheets

(51) Int. Cl.
*H04W 72/0446* (2023.01)
*H04W 72/0453* (2023.01)

(56) References Cited

U.S. PATENT DOCUMENTS

| | | |
|---|---|---|
| 2016/0065342 A1 | 3/2016 | Mirbagheri et al. |
| 2018/0331799 A1 | 11/2018 | Zhang et al. |
| 2021/0297215 A1* | 9/2021 | Da .................... H04W 72/0446 |

FOREIGN PATENT DOCUMENTS

| | | |
|---|---|---|
| CN | 106656446 A | 5/2017 |
| EP | 2418887 A2 | 2/2012 |
| WO | WO-2017061774 A1 | 4/2017 |
| WO | WO-2018058590 A1 | 4/2018 |
| WO | WO-2018064537 A1 | 4/2018 |

OTHER PUBLICATIONS

Extended European Search Report regarding Application No. 19848731.6, dated Apr. 7, 2022.
Ericsson: "PRS pattern enhancement for indoor positioning", 3GPP Draft; R1-152519, 3rd Generation Partnership Project (3GPP), Mobile Competence Centre ; 650, Route Des Lucioles; F-06921 Sophia-Antipolis Cedex France vol. RAN WG1, No. Fukuoka, Japan; May 25, 2015-May 29, 2015 May 24, 2015 (May 24, 2015).
Huawei et al. "Design of New Downlink Positioning Reference Signal for NB-IoT" 3GPP TSG RAN WG1 Meeting #86bis R1-1608618, Oct. 10, 2016 (Oct. 10, 2016), section 3.
Pantech & Curitel, "PRS Design for LTE Rel-9 Positioning" 3GPP TSG RAN WG1 Meeting #57-bis R1-092590, Jun. 29, 2009 (Jun. 29, 2009), entire document.
ZTE, "Summary of DL aspects for TDD NB-IoT" 3GPP TSG RAN WG1 Meeting #93 R1-1807466, Busan, Korea, May 21-25, 2018.
Ericsson, "Further details of PRS pattern enhancement " 3GPP TSG RAN WG1 Meeting #84bis. R1-162874, Apr. 11-16, 2016.
International Search Report (English and Chinese) and Written Opinion (Chinese) of the International Searching Authority issued in PCT/CN2019/096465, dated Sep. 30, 2019; ISA/CN.

* cited by examiner

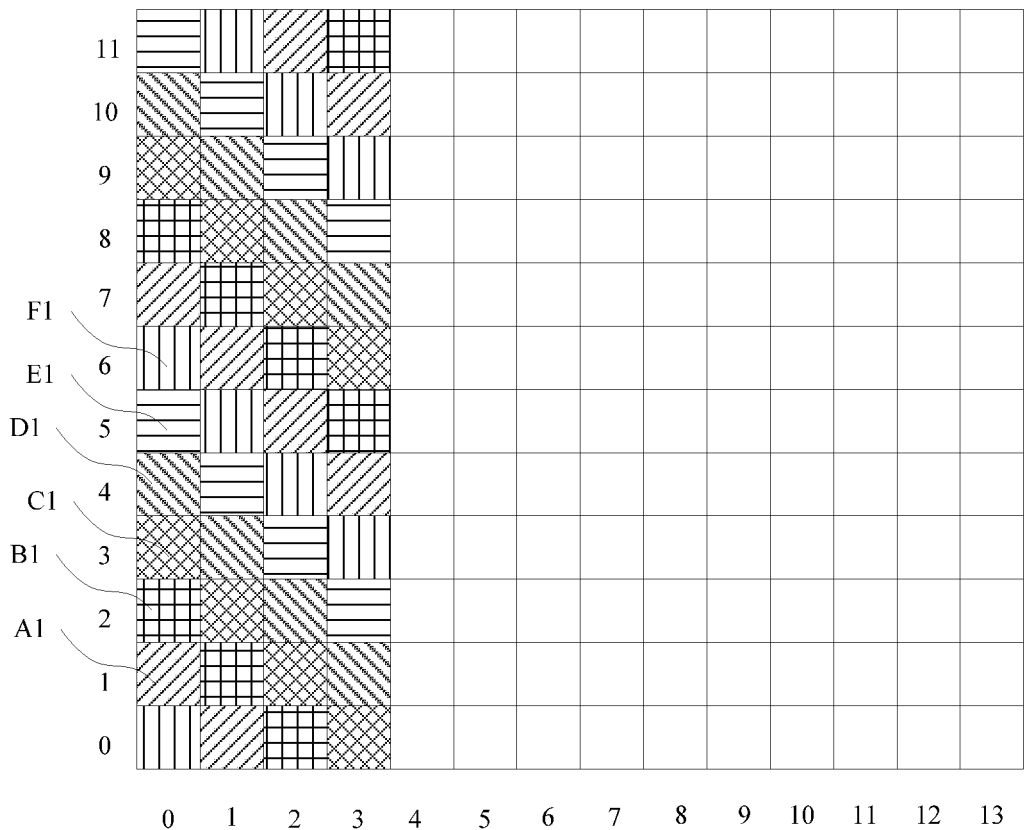

Figure 4

| determining valid time-frequency patterns in a corresponding resource block where a first time slot of the multiple time slots is located are final time-frequency patterns of the corresponding resource block where the first time slot is located | ⟵ S501 |

| at least according to a sequence of the multiple time slots, obtaining final time-frequency patterns in a corresponding resource block where a next time slot is located by performing frequency shift to final time-frequency patterns in a corresponding resource block where a current time slot is located, wherein the final time-frequency patterns in the multiple resource blocks are the time-frequency pattern of the downlink PRS | ⟵ S502 |

Figure 5

METHOD AND DEVICE FOR DETERMINING TIME-FREQUENCY PATTERN OF DOWNLINK POSITIONING REFERENCE SIGNAL, STORAGE MEDIUM AND BASE STATION

CROSS-REFERENCE TO RELATED APPLICATIONS

This application is the national phase of International Application No. PCT/CN2019/096465, filed on Jul. 18, 2019, which claims the benefit of priority to Chinese Patent Application No. 201810906997.5, filed on Aug. 9, 2018, and entitled "METHOD AND DEVICE FOR DETERMINING TIME-FREQUENCY PATTERN OF DOWNLINK POSITIONING REFERENCE SIGNAL, STORAGE MEDIUM AND BASE STATION". The entire disclosures of the above applications are incorporated herein by reference.

TECHNICAL FIELD

The present disclosure generally relates to communication technology field, and more particularly, to a method and a device for determining a time-frequency pattern of a downlink positioning signal, a storage medium and a base station.

BACKGROUND

In the Time Division Duplexing (TDD) mode of Long-Term Evolution (LTE) system, at most 2 special sub-frames are included in each radio frame. In a special sub-frame, only a part of the symbols are downlink symbols, which may be used to transmit downlink signals. In the LTE system, the time-frequency resource pattern of the Positioning Reference Signal (PRS) is fixed.

In New Radio (NR) system, the time-frequency pattern of the Reference Signal (RS) is located in a slot (in a sub-frame in LTE). In the TDD mode of the NR system, a base station configures multiple consecutive time slots as a D+X+U structure, where D includes x1 downlink time slots and x2 downlink symbols, and U includes y1 uplink time slots and y2 uplink symbols, and X is a flexible sub-frame, which may be further determined to include a part of downlink symbols and a part of the uplink symbols. As for a time slot, there are many ways for allocating uplink and downlink symbols. Therefore, there are many time slots in the NR system which include both uplink and downlink symbols, and there are many ways for allocating uplink and downlink symbols in each time slot.

However, if the PRS can only occupy a fixed part of the symbols (such as the last 2 symbols of each time slot) in multiple consecutive time slots, only a part of the subcarriers will be occupied, resulting in limited positioning measurement accuracy. In addition, the PRS will not be sent in a special sub-frame in LTE, which avoids complicated consideration of time-frequency patterns of the PRS for the special sub-frame. However, many time slots in the NR system include both uplink and downlink symbols. Therefore, the time-frequency patterns of the PRS in LTE cannot be directly used in the NR system.

Therefore, a method for determining time-frequency patterns of the PRS in the NR system is needed.

SUMMARY

Embodiments of the present disclosure may solve the problem about how to determine a time-frequency pattern of a downlink positioning reference signal in a NR system.

In an embodiment of the present disclosure, a method for determining a time-frequency pattern of a downlink positioning signal (PRS) is provided, including: determining a number of subcarriers M occupied by a time-frequency pattern of a PRS on each symbol according to a preset frequency domain multiplexed factor; for multiple time slots scheduled by a user equipment, generating initial time-frequency patterns in each resource block where each time slot is located according to the number of subcarriers M, wherein the initial time-frequency patterns occupy all symbols in the resource block, and occupy M subcarriers on each symbol of the resource block; and filtering M initial time-frequency patterns in each resource block according to attributes of symbols in the resource block, so as to determine valid time-frequency patterns in each resource block.

Optionally, the method for determining a time-frequency pattern of a downlink PRS further includes: determining valid time-frequency patterns in a corresponding resource block where a first time slot of the multiple time slots is located are final time-frequency patterns of the corresponding resource block where the first time slot is located; and at least according to a sequence of the multiple time slots, obtaining final time-frequency patterns in a corresponding resource block where a next time slot is located by performing frequency shift to final time-frequency patterns in a corresponding resource block where a current time slot is located, wherein the final time-frequency patterns in the multiple resource blocks are the time-frequency pattern of the downlink PRS.

Optionally, at least according to a sequence of the multiple time slots, obtaining final time-frequency patterns in a corresponding resource block where a next time slot is located by performing frequency shift to final time-frequency patterns in a corresponding resource block where a current time slot is located includes: according to attributes of symbols in each resource block, filtering the final time-frequency patterns in the multiple resource blocks after performing the frequency shift, so as to obtain the time-frequency pattern of the downlink PRS.

Optionally, the method for determining a time-frequency pattern of a downlink PRS further includes: sending the PRS to the user equipment by using the time-frequency pattern of the PRS.

Optionally, at least according to a sequence of the multiple time slots, obtaining final time-frequency patterns in a corresponding resource block where a next time slot is located by performing frequency shift to final time-frequency patterns in a corresponding resource block where a current time slot is located includes: moving final time-frequency patterns in a resource block corresponding to time slot i by at least one sub-carrier in a frequency domain, so as to obtain final time-frequency patterns of a resource block corresponding to time slot (i+1), wherein a value range of i is $[n_s, n_s+N_{PRS}-1]$, where $n_s$ represents a first time slot of the multiple time slots, and $N_{PRS}$ represents a number of the multiple time slots.

Optionally, moving final time-frequency patterns in a resource block corresponding to time slot i by at least one sub-carrier in a frequency domain includes: according to a subcarrier number k of valid time-frequency patterns on Symbol l in the resource block corresponding to the time slot i, determining a subcarrier number k' of valid time-frequency patterns on Symbol l in the resource block corresponding to the time slot (i+1) as (k+1) mod K or (k−1) mod K, where K is the preset frequency domain multiplexed factor, and a value range of k is [0, 11].

Optionally, filtering M initial time-frequency patterns in each resource block according to attributes of symbols in the resource block includes: reserving initial time-frequency patterns located on downlink symbols in the resource block; removing initial time-frequency patterns located on symbols which are occupied by a control channel or other reference signals in the resource block.

In an embodiment of the present disclosure, a device for determining a time-frequency pattern of a downlink positioning signal (PRS) is provided, including: a subcarrier number determination module, adapted to determine a number of subcarriers M occupied by a time-frequency pattern of a PRS on each symbol according to a preset frequency domain multiplexed factor; an initial time-frequency pattern generation module, adapted to, for multiple time slots scheduled by a user equipment, generate initial time-frequency patterns in each resource block where each time slot is located according to the number of subcarriers M, wherein the initial time-frequency patterns occupies all symbols in the resource block, and occupies M subcarriers on each symbol of the resource block; and a filtering module, adapted to filter M initial time-frequency patterns in each resource block according to attributes of symbols in the resource block, so as to determine valid time-frequency patterns in each resource block.

Optionally, the device for determining a time-frequency pattern of a downlink PRS further includes: a final time-frequency pattern determination module, adapted to determine valid time-frequency patterns in a corresponding resource block where a first time slot of the multiple time slots is located are final time-frequency patterns of the corresponding resource block where the first time slot is located; and a frequency shift module, adapted to, at least according to a sequence of the multiple time slots, obtain final time-frequency patterns in a corresponding resource block where a next time slot is located by performing frequency shift to final time-frequency patterns in a corresponding resource block where a current time slot is located, wherein final time-frequency patterns in the multiple resource blocks are the time-frequency pattern of the PRS.

Optionally, the frequency shift module includes: a filtering unit, adapted to filter the final time-frequency patterns in the multiple resource blocks after the frequency shift according to the attributes of the symbols in each resource block, so as to obtain the time-frequency pattern of the positioning reference signal.

Optionally, the device for determining a time-frequency pattern of a downlink PRS further includes: a positioning reference signal sending module, adapted to send the positioning reference signal to the user equipment according to the time-frequency pattern of the positioning reference signal.

Optionally, the frequency shift module includes: a frequency shift unit, adapted to move final time-frequency patterns of a resource block corresponding to time slot i by at least one sub-carrier in a frequency domain, so as to obtain final time-frequency patterns of a resource block corresponding to time slot (i+1), wherein a value range of i is $[n_s, n_s+N_{PRS}-1]$, where $n_s$ represents a first time slot of the multiple time slots, and $N_{PRS}$ represents a number of the multiple time slots.

Optionally, the frequency shift unit, according to a subcarrier number k of a valid time-frequency pattern a (f) on Symbol l in the resource block corresponding to the time slot i, determines a subcarrier number k' of a valid time-frequency pattern a (+1) on Symbol l in the resource block corresponding to the time slot (i+1) as (k+1) mod K or (k−1) mod K, where K is the preset frequency domain multiplexed factor, and a value range of k is [0, 11].

Optionally, the filtering module includes: a reserving unit, adapted to reserve initial time-frequency patterns located on downlink symbols in each resource block; and a removing unit, adapted to remove initial time-frequency patterns located on symbols which are occupied by a control channel or other reference signals in each resource block.

In an embodiment of the present disclosure, a storage medium having computer instructions stored therein is provided, wherein once the computer instructions are executed, the above method for determining a time-frequency pattern of a downlink PRS is performed.

In an embodiment of the present disclosure, a base station including a memory and a processor is provided, wherein the memory has computer instructions stored therein, and when the processor executes the computer instructions, the above method for determining a time-frequency pattern of a downlink PRS is performed.

Embodiments of the present disclosure may provide following advantages.

In embodiments of the present disclosure, according to a preset frequency domain multiplexed factor, a number of subcarriers M occupied by a time-frequency pattern of the PRS on each symbol is determined; for multiple time slots scheduled by a user equipment, initial time-frequency patterns are generated in a resource block where each time slot is located according to the number of subcarriers M, wherein the initial time-frequency pattern occupy all symbols in the resource block; and M initial time-frequency patterns in each resource block are filtered according to attributes of symbols in the resource block, so as to determine valid time-frequency patterns in each resource block. Therefore, in the embodiments, the M kinds of initial time-frequency patterns in each resource block scheduled by the user equipment are generated first, and then the valid time-frequency patterns are selected and determined according to the attributes of symbols in each resource block. The valid time-frequency patterns can support the positioning reference signal to be sent in a time slot including uplink and downlink symbols in the NR system, so that the base station in the NR system can transmit the downlink positioning reference signal at a time-frequency position provided by the valid time-frequency patterns, thereby ensuring the successful transmission of the downlink positioning reference signal.

Further, at least according to a sequence of the multiple time slots, final time-frequency patterns in a resource block where a next time slot is located are obtained by performing frequency shift to final time-frequency patterns in a resource block where a current time slot is located, wherein the final time-frequency patterns in the multiple resource blocks are time-frequency patterns of the PRS. According to the embodiments of the present disclosure, by shifting the final time-frequency patterns in the multiple resource blocks, that is, by shifting the time-frequency positions of the positioning reference signal in the frequency domain, the time-frequency positions of the positioning reference signal can occupy different sub-carriers in different time slots, thereby improving positioning and measurement accuracy.

Further, in embodiments of the present disclosure, initial time-frequency patterns on downlink symbols in the resource block are reserved; and initial time-frequency patterns on symbols which are occupied by a control channel or other reference signals in the resource block are removed. Therefore, by performing the reserving and removing operations, the valid time-frequency patterns can be determined on the downlink symbols, and conflicts with control signals or other reference signals can be avoided, thereby ensuring the successful transmission of the downlink positioning reference signal.

BRIEF DESCRIPTION OF THE DRAWINGS

FIGS. 2 to 4 are schematic diagrams of specific application scenarios according to embodiments of the present disclosure;

FIG. 5 schematically illustrates a flow chart of a specific implementation of a method for determining a time-frequency pattern of a PRS according to an embodiment.

DETAILED DESCRIPTION

As described in the background, in multiple consecutive time slots, if a positioning reference signal (PRS) only occupies a fixed portion of symbols (for example, the last 2 symbols of each time slot), only a part of subcarriers will be occupied, result in limited positioning measurement accuracy. In addition, a PRS in LTE will not be sent in a special sub-frame, which avoids complicated consideration of time-frequency patterns of the PRS for special sub-frames. However, there are many time slots in a NR system that includes both uplink and downlink symbols. Therefore, the time-frequency patterns of the PRS in LTE cannot be directly used in the NR system.

Therefore, a method for determining the time-frequency pattern of a PRS in the NR system is needed.

In embodiments of the present disclosure, M kinds of initial time-frequency patterns in a resource block scheduled by a user equipment are generated first, and then valid time-frequency patterns are selected and determined according to attributes of symbols in the resource block. The valid time-frequency patterns can support a positioning reference signal to be sent in a time slot including uplink and downlink symbols in the NR system, so that a base station in the NR system can transmit the downlink positioning reference signal at a time-frequency position provided by the valid time-frequency patterns, thereby ensuring the successful transmission of the downlink positioning reference signal.

In order to clarify the object, characteristic and advantages of embodiments of the present disclosure, embodiments of present disclosure will be described clearly in detail in conjunction with accompanying drawings.

Figure 1:
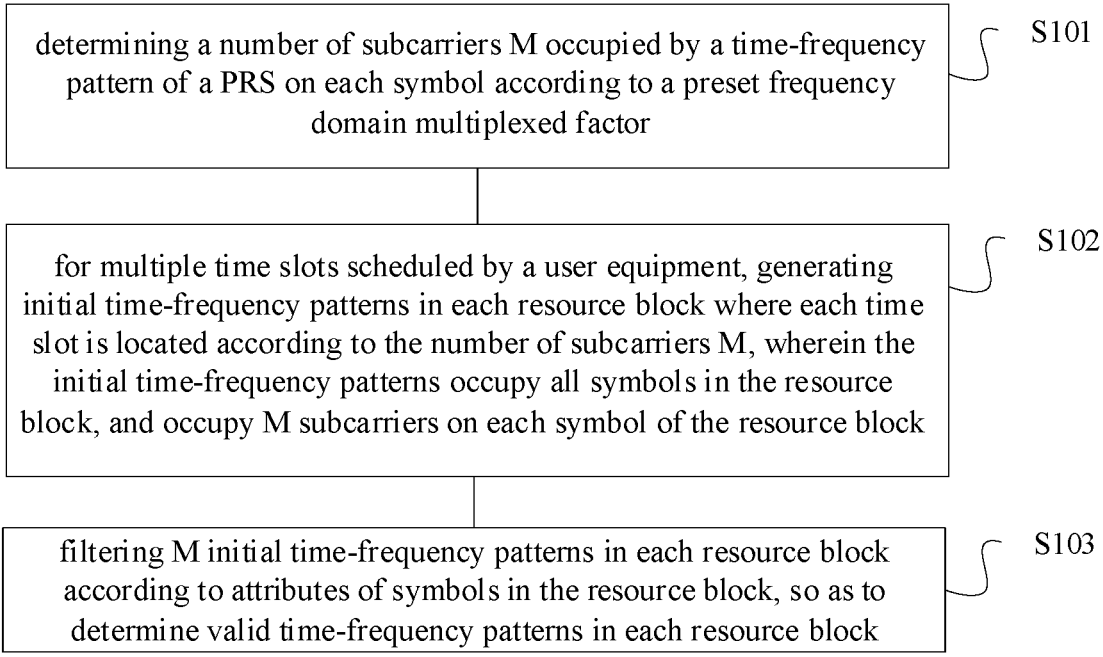
FIG. 1 schematically illustrates a flow chart of a method for determining a time-frequency pattern of a downlink positioning reference signal (PRS) according to an embodiment.

FIG. 1 schematically illustrates a flow chart of a method for determining a time-frequency pattern of a downlink positioning reference signal (PRS) according to an embodiment.

The method for determining a time-frequency pattern of a downlink PRS may apply to a base station. Referring to FIG. 1, the method includes S101 to S103.

In S101, according to a preset frequency domain multiplexed factor, a number of subcarriers M occupied by a time-frequency pattern of the PRS on each symbol is determined.

In S102, for multiple time slots scheduled by a user equipment, initial time-frequency patterns are generated in a resource block where each time slot is located according to the number of subcarriers M, wherein the initial time-frequency pattern occupy all symbols in the resource block, and occupy M subcarriers on each symbol of the resource block.

In S103, M initial time-frequency patterns in each resource block are filtered according to attributes of symbols in the resource block, so as to determine valid time-frequency patterns in each resource block.

The time-frequency patterns of the downlink positioning reference signal in embodiments of the present disclosure refers to time-frequency resource positions of the downlink positioning reference signal, specifically refers to time-frequency resource positions of the downlink positioning reference signal in a single Resource Block (RB).

Specifically, the preset frequency domain multiplexed factor may be preset by the base station, or specified in a communication standard protocol. Furthermore, in the NR system, a single resource block occupies one time slot in the time domain and 12 subcarriers in the frequency domain. The preset frequency domain reuse factor may be 6 or 12. When the preset frequency domain multiplexed factor is 6, each user equipment (UE) can occupy two subcarriers in a single resource block, and a single resource block can be used by 6 UEs, ensuring that scheduling resources of the 6 UEs do not conflict. When the preset frequency domain multiplexed factor is 12, each UE can occupy a subcarrier in a single resource block, and a single resource block can be used by 12 UEs, ensuring that scheduling resources of the 12 UEs do not conflict.

In some embodiments, in S101, different preset frequency domain multiplexed factors correspond to different subcarrier numbers M. For example, if the preset frequency domain multiplexed factor is 6, types of frequency domain patterns that can be generated in a single RB is 6, and the number of subcarriers M occupied by time-frequency patterns of the positioning reference signal on each symbol is 2; if the frequency domain multiplexed factor is 12, types of frequency domain patterns that can be generated in a single RB is 12, and the number of subcarriers M occupied by time-frequency patterns of the positioning reference signal on each symbol is 1.

In some embodiments, in S102, the base station may obtain the resource blocks scheduled by the UE, that is, the base station may obtain the multiple time slots scheduled by the UE. Specifically, the multiple time slots are continuous in time. When the multiple time slots are located in a same sub-frame, serial numbers of the multiple time slots may be continuous; when the multiple time slots are located in different sub-frames, the serial numbers of the multiple time slots may not be continuous.

In some embodiments, the base station may generate the initial time-frequency patterns in the resource block scheduled by the UE, that is, the resource block in which the multiple time slots are located. The initial time-frequency patterns occupy all the symbols in the resource block.

Figure 2:
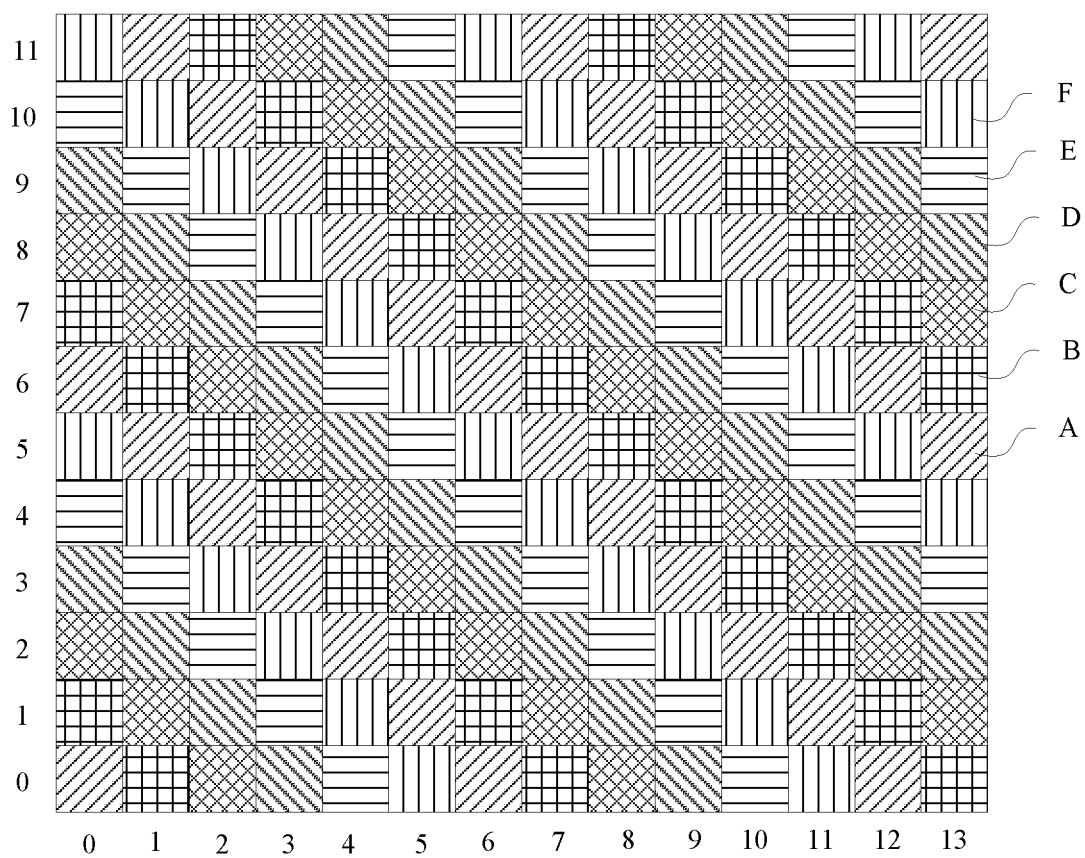

Referring to FIG. 2, FIG. 2 shows initial time-frequency patterns in a single RB when the preset frequency domain multiplexed factor is 6. The X-axis in FIG. 2 represents the time domain, and the unit is symbol; the Y-axis represents the frequency domain, and the unit is subcarrier.

Referring to FIG. 2, each filling style (that is, A, B, C, D, E and F) represents an initial time-frequency pattern. The resource block shown in FIG. 2 includes six initial time-frequency patterns. The 6 initial time-frequency patterns occupy 14 symbols and 12 subcarriers. Each initial time-frequency pattern occupies 14 symbols and occupies 2 subcarriers on each symbol.

In some embodiments, in S103, the valid time-frequency patterns may be determined according to the attributes of the symbols in the resource block. Specifically, the time slots scheduled by the UE include uplink symbols and downlink symbols, and downlink positioning reference signals can only be transmitted on downlink symbols, therefore, the uplink and downlink attributes of the symbols need to be considered to determine the valid time-frequency patterns.

Furthermore, other data, such as control signals, may be transmitted in the time slots scheduled by the UE. In order to avoid transmission conflicts between the downlink positioning reference signal and other data, occupancy situation of the symbols needs to be considered to determine the valid time-frequency patterns.

According to the embodiment of the present disclosure, M kinds of initial time-frequency patterns are generated firstly in the resource blocks scheduled by the user equipment, and then the valid time-frequency patterns according to the attributes of the symbols in the resource blocks are determined; the valid time-frequency patterns can support a positioning reference signal to be sent in the time slot that includes both uplink and downlink symbols in the NR system, so that the base station in the NR system can transmit the downlink positioning reference signal at time-frequency positions provided by the valid time-frequency patterns, thereby ensuring the successful transmission of the downlink positioning reference signal.

In an embodiment, S103 shown in FIG. 1 may include the following steps:

reserving initial time-frequency patterns on downlink symbols in the resource block; and removing initial time-frequency patterns on symbols which are occupied by a control channel or other reference signals in the resource block.

In the embodiment, whether the symbols referred to by the valid time-frequency patterns are downlink or occupied, is determined.

As mentioned above, uplink symbols are used for the UE to send data to the base station, and the downlink reference signal can only be transmitted on downlink symbols. Therefore, the time-frequency patterns of the downlink reference signal can only be located on the downlink symbols. If the initial time-frequency patterns are located on the uplink symbols in the RB, the initial time-frequency patterns on the uplink symbol needs to be removed, that is, the initial time-frequency patterns on the uplink symbols are invalid.

In addition, the base station may send control channels or other reference signals to the UE through downlink symbols. Therefore, initial time-frequency patterns on downlink symbols on which a control channel or other reference signal is sent are invalid.

According to the embodiments of the present disclosure, by performing the reserving and removing operations, the valid time-frequency patterns can be determined on the downlink symbols, and conflicts with control signals or other reference signals can be avoided, thereby ensuring the successful transmission of the downlink positioning reference signal.

Figure 3:
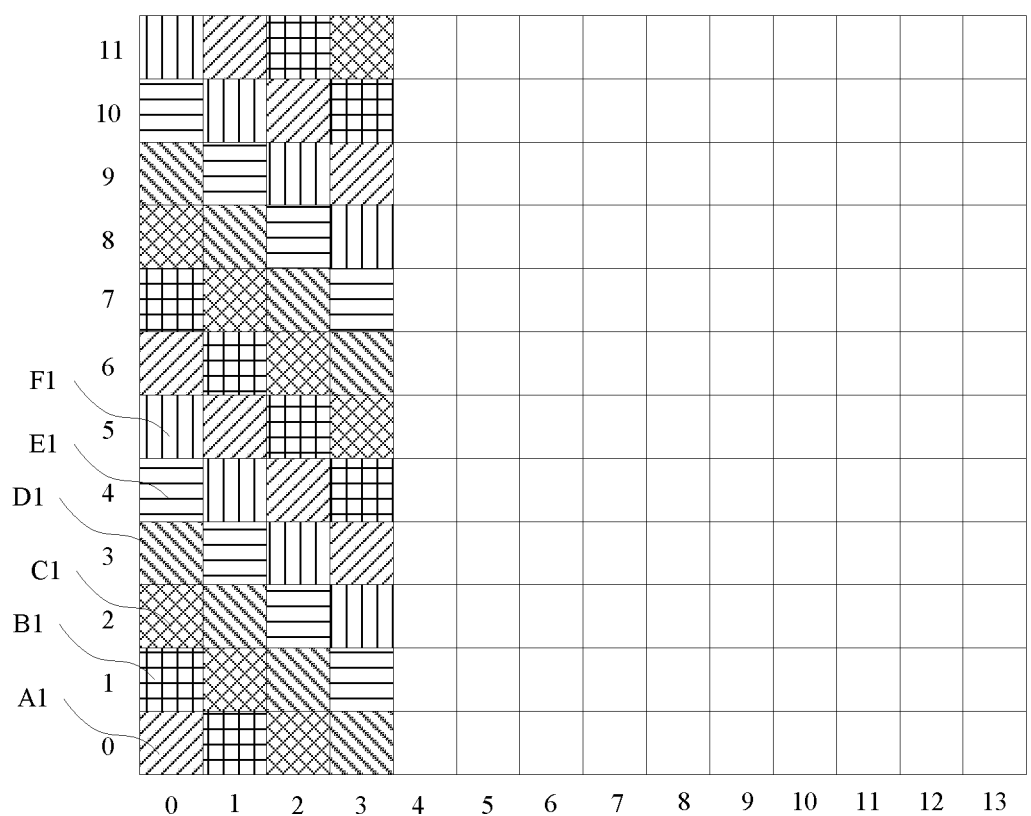

Referring to FIG. 3, FIG. 3 shows valid time-frequency patterns in a single RB when the preset frequency domain multiplexed factor is 6. The valid time-frequency patterns are a part of the FIG. 3 filled with patterns. The X-axis in the figure represents the time domain, and the unit is symbol; the Y-axis is the frequency domain, and the unit is subcarrier.

Specifically, Symbols 4 to 9 are uplink symbols and Symbols 10 to 13 are occupied by control channels and other reference signals. Therefore, initial time-frequency patterns on Symbols 4 to 13 in FIG. 2 are removed, and reserved initial time-frequency patterns are valid time-frequency patterns.

The base station may send a downlink reference signal to the user equipment at a time-frequency position indicated by the valid time-frequency patterns.

Referring to FIG. 5, the method for determining the time-frequency pattern shown in FIG. 1 may further include S501 and S502.

In S501: determining the valid time-frequency patterns in a corresponding resource block where a first time slot of the multiple time slots is located is final time-frequency patterns of the corresponding resource block where the first time slot is located;

Step S502: at least according to a sequence of the multiple time slots, obtaining final time-frequency patterns in a resource block where a next time slot is located by performing frequency shift to final time-frequency patterns in a resource block where a current time slot is located, wherein the final time-frequency patterns in the multiple resource blocks are time-frequency patterns of the PRS.

In some embodiments, an amplitude of the frequency shift may be a subcarrier; and the frequency shift may be performed in the direction of increasing the serial numbers of subcarriers or decreasing the serial numbers of subcarriers.

It can be understood that, there is no need to perform frequency shift to the valid time-frequency patterns in the resource block where the first time slot of the multiple time slots is located. In other words, the valid time-frequency patterns in the resource block where the first time slot of the multiple time slots is located is the final time-frequency patterns.

According to the embodiments of the present disclosure, by shifting the final time-frequency patterns in the multiple resource blocks, that is, by shifting the time-frequency positions of the positioning reference signal in the frequency domain, the time-frequency positions of the positioning reference signal can occupy different sub-carriers in different time slots, thereby improving positioning and measurement accuracy.

Referring to FIGS. 3 and 4, FIG. 3 shows a resource block where time slot 0 is located, and FIG. 4 shows a resource block where time slot 1 is located. Both time slot 0 and time slot 1 are scheduled by the UE, and time slot 1 is the next time slot of time slot 0.

As shown in FIG. 3, on Symbol 0 of time slot 0, time-frequency pattern position A1 is located at Subcarrier 0, time-frequency pattern position B1 is located at Subcarrier 1, time-frequency pattern position C1 is located at Subcarrier 2, and time-frequency pattern position D1 is located at Subcarrier 3, time-frequency pattern position E1 is located at Subcarrier 4, time-frequency pattern position F1 is located at Subcarrier 5, and so on.

Referring to FIG. 4, the final time-frequency patterns in the resource block where time slot 1 is shown in FIG. 4 after performing frequency shift to the final time-frequency patterns shown in FIG. 3.

Specifically, on Symbol 0 of time slot 0, time-frequency pattern position A1 is located in Subcarrier 1, time-frequency pattern position B1 is located in Subcarrier 2, time-frequency pattern position C1 is located in Subcarrier 3, time-frequency pattern position D1 is located in Subcarrier 4, time-frequency pattern position E1 is located at Subcarrier 5, time-frequency pattern position F1 is located at Subcarrier 6, and so on.

Further, S502 may include the following steps: filtering the final time-frequency patterns in the multiple resource blocks after the frequency shift according to the attributes of the symbols in each resource block, so as to obtain the time-frequency pattern of the positioning reference signal.

As described above, the final time-frequency patterns in a resource block where a previous time slot of a current time slot is located, is frequency-shifted to obtain the final time-frequency patterns in a resource block where the current time slot is located.

Since the attributes of the symbols in a corresponding resource block where each time slot is located may be different, the time-frequency patterns obtained by shifting the final time-frequency patterns corresponding to a previous time slot may conflict with other resources, such as control channels, other reference signals, in the resource block where a current time slot is located. Therefore, the final time-frequency patterns needs to be filtered to obtain the time-frequency pattern that can be used to send the positioning reference signal.

As for the specific filtering method and principle, please refer to the aforementioned process of filtering the initial time-frequency patterns, which will not be repeated here.

Further, the base station may use the time-frequency pattern of the positioning reference signal to send the positioning reference signal to the user equipment.

Specifically, a network side may configure multiple positioning occasions for the UE, and each positioning occasion includes multiple positioning sub-frames. Each base station determines a time-frequency pattern in a resource block where a time slot of each positioning sub-frame is located, where the time-frequency pattern in the resource block is used for each base station to send the PRS.

In some embodiments, S502 may include: moving final time-frequency patterns of a resource block corresponding to time slot i by at least one sub-carrier in a frequency domain, so as to obtain final time-frequency patterns of a resource block corresponding to time slot (i+1), wherein a value range of i is $[n_s, n_s+N_{PRS}-1]$, where $n_s$ represents a first time slot of the multiple time slots, and $N_{PRS}$ represents a number of the multiple time slots.

Both $n_s$ and $N_{PRS}$ are both positive integers.

In the embodiment, the serial number i of the time slot does not use serial numbers of the time slots in the sub-frame, because the serial numbers of the time slots usually starts from a radio frame boundary, and the serial numbers of the time slots may change, which may result in frequency-shift change of time-frequency patterns of the PRS, so the value range of i is defined as $[n_s, n_s+N_{PRS}-1]$, so as to ensure the continuity of the serial numbers of the time slots.

Specifically, moving final time-frequency patterns of a resource block corresponding to time slot i by at least one sub-carrier in a frequency domain includes: moving the final time-frequency patterns of the resource block in the time slot i by at least one subcarrier in the direction of increasing serial numbers of subcarriers or decreasing serial numbers of subcarriers.

Specifically, according to a subcarrier number k of a valid time-frequency pattern $a_{k,l}(i)$ on Symbol l in the resource block corresponding to the time slot i, a subcarrier number k' of a valid time-frequency pattern $a_{k',l}(i+1)$ on Symbol l in the resource block corresponding to the time slot (i+1) is determined as (k+1) mod K or (k-1) mod K, where K is the preset frequency domain multiplexed factor, and a value range of k is [0, 11].

It should be noted that, i, k, k', l, and K are positive integers, and a value range of i is [0, 13].

Figure 6:
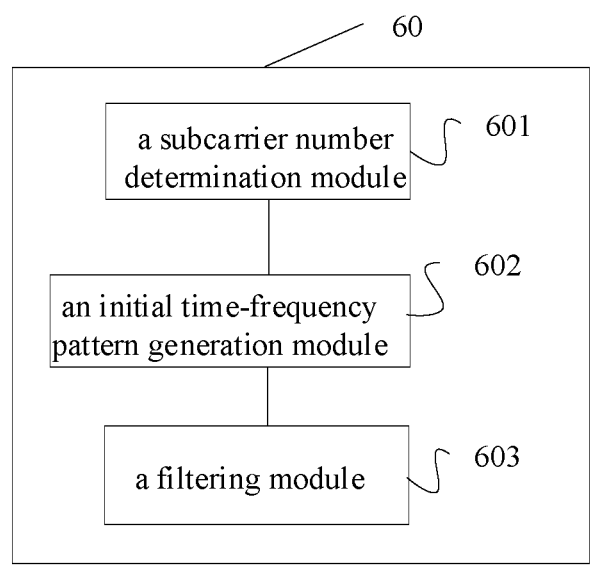
FIG. 6 schematically illustrates a block diagram of a device for determining a time-frequency pattern of a PRS according to an embodiment.

Referring to FIG. 6, FIG. 6 schematically illustrates a block diagram of a device for determining a time-frequency pattern of a positioning reference signal (PRS) according to an embodiment. The device may apply to a base station. The device for determining the time-frequency pattern of the PRS 60 includes:

a subcarrier number determination module 601, adapted to determine a number of subcarriers M occupied by time-frequency patterns of the PRS on each symbol according to a preset frequency domain multiplexed factor;

an initial time-frequency pattern generation module 602, adapted to, for multiple time slots scheduled by a user equipment, generate initial time-frequency patterns in each resource block where each time slot is located according to the number of subcarriers M, wherein the initial time-frequency patterns occupy all symbols in the resource block, and occupy M subcarriers on each symbol of the resource block.

a filtering module 603, adapted to filter M initial time-frequency patterns in each resource block according to attributes of symbols in the resource block, so as to determine valid time-frequency patterns in each resource block.

According to the embodiment of the present disclosure, M kinds of initial time-frequency patterns are generated firstly in the resource blocks scheduled by the user equipment, and then the valid time-frequency patterns according to the attributes of the symbols in the resource blocks are determined; the valid time-frequency patterns can support a positioning reference signal to be sent in the time slot that includes both uplink and downlink symbols in the NR system, so that the base station in the NR system can transmit the downlink positioning reference signal at time-frequency positions provided by the valid time-frequency patterns, thereby ensuring the successful transmission of the downlink positioning reference signal.

In some embodiments, the device for determining the time-frequency pattern of the PRS 60 further includes: a final time-frequency pattern determination module, adapted to determine the valid time-frequency patterns in a corresponding resource block where a first time slot of the multiple time slots is located are final time-frequency patterns of the corresponding resource block where the first time slot is located; and a frequency shift module, adapted to, at least according to a sequence of the multiple time slots, obtain final time-frequency patterns in a resource block where a next time slot is located by performing frequency shift to final time-frequency patterns in a resource block where a current time slot is located, wherein the final time-frequency patterns in the multiple resource blocks are the time-frequency pattern of the PRS.

According to the embodiments of the present disclosure, by shifting the final time-frequency patterns in the multiple resource blocks, that is, by shifting the time-frequency positions of the positioning reference signal in the frequency domain, the time-frequency positions of the positioning reference signal can occupy different sub-carriers in different time slots, thereby improving positioning and measurement accuracy.

In some embodiments, the frequency shift module includes: a filtering unit, adapted to filter the final time-frequency patterns in the multiple resource blocks after the frequency shift according to the attributes of the symbols in each resource block, so as to obtain the time-frequency pattern of the positioning reference signal.

In some embodiments, the device for determining the time-frequency pattern of the PRS 60 further includes: a positioning reference signal sending module, adapted to send the positioning reference signal to the user equipment according to the time-frequency pattern of the positioning reference signal.

In some embodiments, the frequency shift module further includes: a frequency shift unit, adapted to move final time-frequency patterns of a resource block corresponding to time slot i by at least one sub-carrier in a frequency domain, so as to obtain final time-frequency patterns of a resource block corresponding to time slot (i+1), wherein a value range of i is $[n_s, n_s+N_{PRS}-1]$, where $n_s$ represents a first time slot of the multiple time slots, and $N_{PR}S$ represents a number of the multiple time slots.

Specifically, according to a subcarrier number k of a valid time-frequency pattern $a_{k,l}(i)$ on Symbol l in the resource block corresponding to the time slot i, a subcarrier number k' of a valid time-frequency pattern $a_{k',l}(i+1)$ on Symbol l in the resource block corresponding to the time slot (i+1) is determined as (k+1) mod K or (k−1) mod K, where K is the preset frequency domain multiplexed factor, and a value range of k is [0, 11].

The filtering module 603 shown in FIG. 6 may include: a reserving unit, adapted to reserve initial time-frequency patterns located on downlink symbols in each resource block; and a removing unit, adapted to remove initial time-frequency patterns located on symbols which are occupied by a control channel or other reference signals in each resource block.

As for more details about working principles and working modes of the device for determining the time-frequency pattern of the downlink PRS 60, please refer to the above related descriptions in conjunction with FIGS. 1 to 5, which will not be repeated here.

In an embodiment of the present disclosure, a storage medium having computer instructions stored therein is provided, wherein once the computer instructions are executed, the above method shown in FIG. 1 to 5 is performed.

The storage medium may include a Read Only Memory (ROM), a Random Access Memory (RAM), a magnetic disk, an optical disk or the like. Alternatively, the storage medium may include a non-volatile or non-transitory memory or the like.

In an embodiment of the present disclosure, a base station including a memory and a processor is provided, wherein the memory has computer instructions stored therein, and when the processor executes the computer instructions, the above method as shown in FIGS. 1 to 5 is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for determining a time-frequency pattern of a downlink positioning reference signal (PRS), comprising:
    determining a number of subcarriers M occupied by a time-frequency pattern of a PRS on each symbol according to a preset frequency domain multiplexed factor;
    for multiple time slots scheduled by a user equipment, generating initial time-frequency patterns in each resource block where each time slot is located according to the number of subcarriers M, wherein the initial time-frequency patterns occupy all symbols in the resource block, and occupy M subcarriers on each symbol of the resource block; and
    filtering M initial time-frequency patterns in each resource block according to attributes of symbols in the resource block, so as to determine valid time-frequency patterns in each resource block;
    wherein the method further comprises:
        determining valid time-frequency patterns in a corresponding resource block where a first time slot of the multiple time slots is located are final time-frequency patterns of the corresponding resource block where the first time slot is located; and
        at least according to a sequence of the multiple time slots, obtaining final time-frequency patterns in a corresponding resource block where a next time slot is located by performing frequency shift to final time-frequency patterns in a corresponding resource block where a current time slot is located, wherein the final time-frequency patterns in the multiple resource blocks are the time-frequency pattern of the downlink PRS,
    wherein at least according to a sequence of the multiple time slots, obtaining final time-frequency patterns in a corresponding resource block where a next time slot is located by performing frequency shift to final time-frequency patterns in a corresponding resource block where a current time slot is located comprises:
        according to attributes of symbols in each resource block, filtering the final time-frequency patterns in the multiple resource blocks after performing the frequency shift, so as to obtain the time-frequency pattern of the downlink PRS.

2. The method according to claim 1, further comprising: sending the PRS to the user equipment by using the time-frequency pattern of the PRS.

3. The method according to claim 1, wherein at least according to a sequence of the multiple time slots, obtaining final time-frequency patterns in a corresponding resource block where a next time slot is located by performing frequency shift to final time-frequency patterns in a corresponding resource block where a current time slot is located further comprises:
    moving final time-frequency patterns in a resource block corresponding to time slot i by at least one sub-carrier in a frequency domain, so as to obtain final time-frequency patterns of a resource block corresponding to time slot (i+1), wherein a value range of i is $[n_s, n_s+N_{PRS}-1]$, where $n_s$ represents a first time slot of the multiple time slots, and $N_{PRS}$ represents a number of the multiple time slots.

4. The method according to claim 3, wherein moving final time-frequency patterns in a resource block corresponding to time slot i by at least one sub-carrier in a frequency domain comprises:
    according to a subcarrier number k of valid time-frequency patterns on Symbol l in the resource block corresponding to the time slot i, determining a subcarrier number k' of valid time-frequency patterns on Symbol l in the resource block corresponding to the time slot (i+1) as (k+1) mod K or (k−1) mod K, where K is the preset frequency domain multiplexed factor, and a value range of k is [0, 11].

5. A non-transitory storage medium having computer instructions stored therein, wherein once the computer instructions are executed, the method according to claim 1 is performed.

6. The method according to claim 1, wherein said filtering M initial time-frequency patterns in each resource block according to attributes of symbols in the resource block comprises:
   reserving initial time-frequency patterns located on downlink symbols in each resource block; and
   removing initial time-frequency patterns located on symbols which are occupied by a control channel or other reference signals in each resource block.

7. A device for determining a time-frequency pattern of a downlink positioning reference signal (PRS), comprising:
   a subcarrier number determination circuitry, configured to determine a number of subcarriers M occupied by a time-frequency pattern of a PRS on each symbol according to a preset frequency domain multiplexed factor;
   an initial time-frequency pattern generation circuitry, configured to, for multiple time slots scheduled by a user equipment, generate initial time-frequency patterns in each resource block where each time slot is located according to the number of subcarriers M, wherein the initial time-frequency patterns occupy all symbols in the resource block, and occupies M subcarriers on each symbol of the resource block; and
   a filtering circuitry, configured to filter M initial time-frequency patterns in each resource block according to attributes of symbols in the resource block, so as to determine valid time-frequency patterns in each resource block;
   wherein the filtering circuitry comprises:
      a final time-frequency pattern determination circuitry, configured to determine valid time-frequency patterns in a corresponding resource block where a first time slot of the multiple time slots is located are final time-frequency patterns of the corresponding resource block where the first time slot is located; and
      a frequency shift circuitry, configured to, at least according to a sequence of the multiple time slots, obtain final time-frequency patterns in a corresponding resource block where a next time slot is located by performing frequency shift to final time-frequency patterns in a corresponding resource block where a current time slot is located, wherein final time-frequency patterns in the multiple resource blocks are the time-frequency pattern of the PRS;
   wherein the frequency shift circuitry comprises a filtering circuitry, configured to filter the final time-frequency patterns in the multiple resource blocks after the frequency shift according to the attributes of the symbols in each resource block, so as to obtain the time-frequency pattern of the positioning reference signal.

8. The device according to claim 7, further comprising:
   a positioning reference signal sending circuitry, configured to send the positioning reference signal to the user equipment according to the time-frequency pattern of the positioning reference signal.

9. The device according to claim 7, wherein the frequency shift circuitry further comprises:
   a frequency shift circuitry, configured to move final time-frequency patterns of a resource block corresponding to time slot i by at least one sub-carrier in a frequency domain, so as to obtain final time-frequency patterns of a resource block corresponding to time slot (i+1), wherein a value range of i is $[n_s, n_s+N_{PRS}-1]$, where $n_s$ represents a first time slot of the multiple time slots, and $N_{PRS}$ represents a number of the multiple time slots.

10. The device according to claim 9, wherein the frequency shift circuitry, according to a subcarrier number k of a valid time-frequency pattern (i) on Symbol l in the resource block corresponding to the time slot i, determines a subcarrier number k' of a valid time-frequency pattern $a_{k',l}(i+1)$ on Symbol l in the resource block corresponding to the time slot (i+1) as (k+1) mod K or (k−1) mod K, where K is the preset frequency domain multiplexed factor, and a value range of k is [0, 11].

11. The device according to claim 7, wherein the filtering circuitry comprises:
   a reserving circuitry, configured to reserve initial time-frequency patterns located on downlink symbols in each resource block; and
   a removing circuitry, configured to remove initial time-frequency patterns located on symbols which are occupied by a control channel or other reference signals in each resource block.

* * * * *